United States Patent Office 2,741,617
Patented Apr. 10, 1956

2,741,617

N-SUBSTITUTED DIHYDRONORCODEINONE

Robert L. Clark, Woodbridge, N. J., assignor to Merck & Co., Inc., Rahway, N. J., a corporation of New Jersey No Drawing. Application February 5, 1953,
Serial No. 335,403

16 Claims. (Cl. 260—285)

This invention is concerned generally with novel derivatives of morphine and with processes for preparing these morphine derivatives. More particularly, it relates to novel N-substituted dihydronorcodeinone compounds having attached to the nitrogen atom the terminal carbon of a straight aliphatic chain consisting of three carbon atoms, to acid salts thereof, and to novel processes for preparing these compounds starting with dihydronorcodeinone. These N-substituted dihydronorcodeinone compounds, and salts thereof, are active as morphine antagonists, and are further useful as antitussives.

This application is a continuation-in-part of my copending application Serial No. 322,144, filed November 22, 1952.

The N-substituted dihydronorcodeinone compounds, and acid salts thereof, subject of the present invention, may be chemically represented by the following structural formulae:

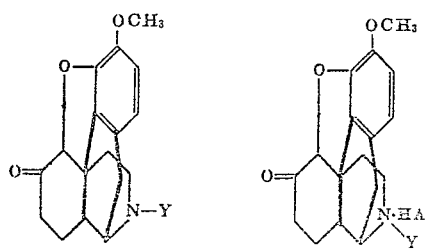

wherein Y is an aliphatic radical containing a straight chain consisting of three carbon atoms, a terminal carbon of which is attached to the nitrogen atom, and HA is an acid.

The chemical relationship of these N-substituted dihydronorcodeinone compounds to morphine is clear from a comparison of the foregoing formulae with the formula for morphine which is as follows:

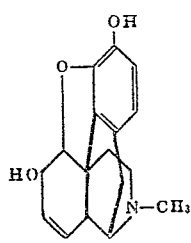

Whereas the alkaloid morphine is a potent analgesic, I have found that N-substituted dihydronorcodeinone compounds having attached to the nitrogen atom the terminal carbon of a straight aliphatic chain consisting of three carbon atoms, in particular N-n-propyldihydronorcodeinone, N-isobutyldihydronorcodeinone, N-allyldihydronorcodeinone, N-methallyldihydronorcodeinone, and acid salts thereof, do not possess any significant analgesic action but, instead, are morphine antagonists and prevent or reduce the analgesic action of morphine when utilized in conjunction with that drug. This antagonistic action possessed by the subject compounds is particularly surprising in view of the fact that other N-alkyldihydronorcodeinone compounds, such as N-methyldihydronorcodeinone (i. e. dihydrocodeinone), N-n-butyldihydronorcodeinone, N-amyldihydronorcodeinone and N-hexyldihydronorcodeinone exhibit no appreciable morphine antagonistic activity.

The N-substituted dihydronorcodeinone compounds having attached to the nitrogen atom the terminal carbon of a straight aliphatic chain consisting of three carbon atoms, and acid salts thereof, can be prepared by reactions which may be chemically represented as follows:

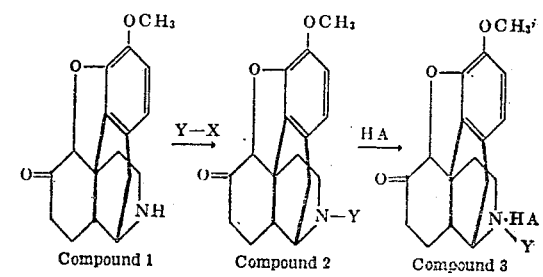

wherein Y is an aliphatic radical containing a straight chain consisting of three carbon atoms a terminal carbon of which is attached to the nitrogen atom, X is a halo radical, and HA is an acid.

The reactions indicated hereinabove are carried out as follows: Dihydronorcodeinone (Compound 1) is reacted with an aliphatic halide of the formula Y—X wherein Y and X have the significance defined hereinabove, thereby forming the corresponding N-substituted dihydronorcodeinone compound (Compound 2); the latter compound is reacted with an acid to produce the corresponding salt of said N-substituted dihydronorcodeinone compound (Compound 3).

The aliphatic halides which react with dihydronorcodeinone to form my novel N-substituted dihydronorcodeinone compounds contain a straight aliphatic chain consisting of three carbon atoms the terminal carbon of which is attached to the halogen atom; in one preferred embodiment of my invention, a methyl grouping is connected to the middle carbon atom of this straight aliphatic chain. I prefer to employ as the aliphatic halide an n-propyl halide such as n-propyl chloride, n-propyl bromide, n-propyl iodide, an isobutyl halide such as isobutyl chloride, isobutyl bromide, isobutyl iodide, an allyl halide such as allyl chloride, allyl bromide, allyl iodide, a methallyl halide such as methallyl chloride, methallyl bromide, methallyl iodide, and the like. The reaction between the aliphatic halide and dihydronorcodeinone is ordinarily conducted by heating the reactants together in contact with an acid-binding agent in a liquid medium which is substantially inert under the reaction conditions and which is a solvent for the reactants. I prefer to utilize, as the liquid medium, a lower aliphatic alcohol such as methanol, ethanol, propanol, and the like. The liquid medium employed should be substantially free of water. As the acid-binding agent I ordinarily utilize an alkali metal carbonate, such as sodium carbonate, potassium carbonate, an alkali metal bicarbonate such as sodium bicarbonate, potassium bicarbonate, an alkaline earth metal carbonate, such as calcium carbonate, barium carbonate, and the like. I prefer to conduct the reaction by bringing together, in an organic solvent, approximately equimolar quantities of dihydronorcodeinone and the aliphatic halide, and heating the solution under reflux in contact with an excess of the acid-binding agent for an extended period of time. I have found that, under these reaction conditions, a heating period of about eight hours or more is ordinarily required to complete the reaction between the dihydronorcodeinone and the aliphatic halide.

In accordance with the foregoing procedure, there is obtained the corresponding N-substituted dihydronorcodeinone compound having attached to the nitrogen atom the terminal carbon of a straight aliphatic chain consisting of three carbon atoms which may have a methyl grouping attached to the middle carbon atom of said chain as, for example, N-n-propyldihydronorcodeinone, N-isobutyldihydronorcodeinone, N-allyldihydronorcodeinone, and N-methallyldihydronorcodeinone. The N-substituted dihydronorcodeinone is conveniently recovered by evaporating the organic solvent from the reaction mixture, preferably under reduced pressure, and extracting the residual material with a solvent such as ether. The ethereal extract is filtered and the filtered solution is evaporated to dryness to give the N-substituted dihydronorcodeinone compound in crude form; this crude material can be purified by recrystallization from lower aliphatic alcohols such as methanol and ethanol.

The conversion of the N-substituted dihydronorcodeinone compounds to the corresponding acid salts is ordinarily conducted by reacting the N-substituted dihydronorcodeinone compound under substantially anhydrous conditions, with an acid, as, for example, hydrogen chloride, hydrogen bromide, sulfuric acid, acetic acid, tartaric acid, citric acid, and the like. This salt-forming reaction is conveniently carried out by dissolving the N-substituted dihydronorcodeinone compound in a hot lower alkanol, such as ethanol, methanol, propanol, and the like, and adding to the solution a slight excess of an alcoholic solution of the appropriate acid. Upon diluting the resulting alcoholic medium with an alcohol-miscible non-solvent for the product, such as diethyl ether, there crystallizes from the mixture the acid salt of the N-substituted dihydronorcodeinone compound such as N-n-propyldihydronorcodeinone hydrochloride, N-n-propyldihydronorcodeinone hydrobromide, N-n-propyldihydronorcodeinone sulfate, N-n-propyldihydronorcodeinone acetate, N-n-propyldihydronorcodeinone tartrate, N-isobutyldihydronorcodeinone hydrochloride, N-isobutyldihydronorcodeinone hydrobromide, N-isobutyldihydronorcodeinone sulfate, N-isobutyldihydronorcodeinone acetate, N-isobutyldihydronorcodeinone tartrate, N-allyldihydronorcodeinone hydrochloride, N-allyldihydronorcodeinone hydrobromide, N-allyldihydronorcodeinone sulfate, N-allyldihydronorcodeinone acetate, N-allydihydronorcodeinone tartrate, N-methallyldihydronorcodeinone hydrochloride, N-methallyldihydronorcodeinone hydrobromide, N-methallyldihydronorcodeinone sulfate, N-methallyldihydronorcodeinone acetate, N-methallyldihydronorcodeinone tartrate, and the like. The salt thus formed is recovered from the alcoholic slurry by filtration or centrifugation.

The dihydronorcodeinone, which is utilized as the starting material in my novel process can be prepared by reacting the commercially-available dihydrocodeinone with cyanogen bromide in chloroform solution to form N-cyanodihydronorcodeinone; and heating said N-cyanodihydronorcodeinone with aqueous hydrochloric acid thereby hydrolyzing the nitrile substituent and decarboxylating the resulting N-carboxydihydronorcodeinone to produce dihydronorcodeinone.

The following examples illustrate methods of carrying out the present invention, but it is to be understood that these examples are given for purposes of illustration and not of limitation.

*Example 1*

A mixture of 1 g. of dihydronorcodeinone, 0.42 g. of allyl bromide, 0.42 g. of sodium bicarbonate and 15 ml. of absolute ethanol is heated under reflux, with stirring, for a period of approximately six hours. The reaction mixture is evaporated to dryness under reduced pressure, the residual material is extracted twice with hot chloroform and the chloroform extracts are combined. The resulting chloroform is filtered through a pad of diatomaceous silica, and the filtered chloroform solution is evaporated to dryness under reduced pressure to give N-allyldihydronorcodeinone which is obtained in the form of a gummy residue. The latter material can be purified, if desired, by dissolving the gummy material in an alcoholic solution of tartaric acid, and allowing the resulting alcoholic solution to stand whereupon a crystalline product precipitates. This crystalline material is recovered by filtration and recrystallized from hot absolute ethanol and dried at 78° C. in vacuo to give, in substantially pure form, the monohydrate of N-allyldihydronorcodeinone tartrate; M. P. 106–110° C.; $[\alpha]_D^{25}$—83.5° (ethanol).

The dihydronorcodeinone utilized as starting material in the foregoing process may be prepared in accordance with the following two-step procedure: (1) A solution of 12 g. of dihydrocodeinone in 25 ml. of dry chloroform is added, dropwise with stirring, over a one and one-half hour period, to a solution of 4.9 g. of cyanogen bromide in 15 ml. of dry chloroform. The resulting solution is heated under reflux for an additional period of one hour, and the reaction mixture is diluted with about 300 ml. of ether. The white solid material which precipitates is recovered by filtration and slurried with about 35 ml. of absolute ethanol for a period of about one hour. The insoluble material is recovered from the alcoholic slurry by filtration, and purified by recrystallization from absolute ethanol to give substantially pure N-cyanodihydronorcodeinone; M. P. 217–218° C.

(2) A mixture of 26.3 g. of N-cyanodihydronorcodeinone, 85 ml. of glacial acetic acid, 30 ml. of concentrated aqueous hydrochloric acid, and 600 ml. of distilled water is heated to a temperature of about 90–92° C. and maintained at that temperature for a period of about forty-eight hours. The amber-colored reaction solution is filtered through a mat of activated charcoal thereby decolorizing said solution. The colorless filtered solution is cooled and to the cold solution is added 100 g. of ice and 200 ml. of aqueous ammonium hydroxide solution. The resulting solution is extracted with four portions of chloroform, the chloroform extracts are combined, and the resulting chloroform solution is dried over magnesium sulfate. The dry chloroform solution is evaporated under reduced pressure, and the residual crystalline material is washed with ether and recrystallized from ethyl acetate to give substantially pure dihydronorcodeinone; M. P. 144–147° C.

*Example 2*

A mixture of 3 g. of dihydronorcodeinone (which can be prepared as set forth under the heading of Example 1 hereinabove), 1.34 g. of sodium bicarbonate, 1.88 g. of N-propyl iodide and 37 ml. of absolute ethanol is heated under reflux, with stirring, for a period of about thirty hours. At the end of this period, the ethanolic reaction mixture is cooled and filtered. The filtered alcoholic solution is evaporated to dryness under reduced pressure and the residual material is extracted with three portions of hot chloroform. The chloroform extracts are combined, and the resulting chloroform solution is evaporated to dryness. The residual material is dissolved in a slight excess of ethanolic hydrogen bromide, and the crystalline material which separates is recrystallized several times from methanol to give substantially pure N-n-propyldihydronorcodeinone hydrobromide, M. P. 293° C.; $[\alpha]_D^{25}$—135° (ethanol).

*Example 3*

A mixture of 4 g. of dihydronorcodeinone (which can be prepared as set forth under the heading of Example 1 hereinabove), 1.78 g. of sodium bicarbonate, 1.35 g. of methallyl chloride and 75 ml. of absolute ethanol was heated under reflux with stirring for a period of about seventy hours. The reaction mixture was filtered while hot, and the filtered alcoholic solution was evaporated to dryness under reduced pressure. The residual oily material was extracted with three portions of petroleum ether, and the combined extracts were evaporated to dryness. The residual material was dissolved in 5 ml. of warm absolute ethanol and the solution was added to a warm alcoholic solution of tartaric acid. The fine cotton-like crystalline material which precipitated upon cooling the solution was recovered by filtration and recrystallized from an aqueous ethanol solution (6 parts ethanol to 1 part of water) to give, in substantially pure form, the monohydrate of N-methallyldihydronorcodeinone tartrate; M. P. 88–92° C., $[\alpha]_D^{25}$—98.5° (ethanol).

*Example 4*

A mixture of 4 g. of dihydronorcodeinone, 1.78 g. of sodium bicarbonate, 75 ml. of absolute ethanol and 2.75 g. of isobutyl iodide was heated under reflux with stirring for a period of about seventy hours. The reaction mixture was filtered while hot and the alcoholic filtrate was evaporated to dryness under reduced pressure. The residual material was extracted with chloroform, and the chloroform was evaporated from the chloroform extract to give a residual oil. The residual oil was triturated with ether and the crystalline N-isobutyldihydronorcodeinone (M. P. 95° C.) thus obtained was dissolved in a small volume of absolute ethanol and added to an ethanolic solution of tartaric acid. The crystalline material which precipitated upon chilling the alcoholic solution was recovered and recrystallized from ethanol to give, in substantially pure form, a hydrated N-isobutyldihydronorcodeinone tartrate; M. P. 98–100° C. $[\alpha]_D^{25}$—97° (ethanol).

Various changes and modifications may be made in carrying out the present invention without departing from the spirit and scope thereof. Insofar as these changes and modifications are within the purview of the annexed claims, they are to be considered as part of my invention.

I claim:
1. A compound selected from the group which consists of N-substituted dihydronorcodeinone compounds having attached to the nitrogen atom a radical selected from the group consisting of N-n-propyl, N-isobutyl, N-allyl and N-methallyl radicals, and acid addition salts thereof.
2. Acid addition salts of N-n-propyldihydronorcodeinone.
3. N-n-propyldihydronorcodeinone hydrobromide.
4. Acid addition salts of N-isobutyldihydronorcodeinone.
5. N-isobutyldihydronorcodeinone tartrate.
6. N-allyldihydronorcodeinone.
7. Acid addition salts of N-allyldihydronorcodeinone.
8. N-allyldihydronorcodeinone tartrate.
9. Acid addition salts of N-methallyldihydronorcodeinone.
10. N-methallyldihydronorcodeinone tartrate.
11. The process which comprises reacting in the presence of an acid-binding agent comprising an alkaline carbonate dihydronorcodeinone with an aliphatic halide, selected from the group which consists of N-n-propyl halides, N-isobutyl halides, N-allyl halides and N-methallyl halides, thereby forming the corresponding N-substituted dihydronorcodeinone compound.
12. The process which comprises reacting dihydronorcodeinone with an n-propyl halide in the presence of an alkali metal bicarbonate to produce N-n-propyl-dihydronorcodeinone.
13. The process which comprises reacting dihydronorcodeinone with an isobutyl halide in the presence of an alkali metal bicarbonate to produce N-isobutyl-dihydronorcodeinone.
14. The process which comprises reacting dihydronorcodeinone with an allyl halide in the presence of an alkali metal bicarbonate to produce N-allyldihydronorcodeinone.
15. The process which comprises reacting dihydronorcodeinone with a methallyl halide in the presence of an alkali metal bicarbonate to produce N-methallyldihydronorcodeinone.
16. The process which comprises reacting dihydronorcodeinone with allyl bromide, said reaction being carried out by heating the reactants together in absolute ethanol under reflux in the presence of sodium bicarbonate, thereby forming N-allyldihydronorcodeinone.

References Cited in the file of this patent
UNITED STATES PATENTS
2,364,833   Weijlard et al. _____ Dec. 12, 1944
FOREIGN PATENTS
289,274   Germany _____ May 11, 1915
OTHER REFERENCES
Braun: Berichte, vol. 49, p. 977, 985, 986 (1916).